United States Patent [19]

Drake

[11] Patent Number: 4,878,332

[45] Date of Patent: Nov. 7, 1989

[54] ELECTRIC RADIANT FLOOR HEATING SYSTEM

[75] Inventor: Lawrence V. Drake, Buffalo, Minn.

[73] Assignee: Infloor, Inc., Hamel, Minn.

[21] Appl. No.: 142,755

[22] Filed: Jan. 11, 1988

[51] Int. Cl.$^4$ ............................................... E04B 1/00
[52] U.S. Cl. .................................... 52/741; 52/220; 219/213
[58] Field of Search ................. 52/319, 741, 743, 220; 219/213, 345

[56] References Cited

U.S. PATENT DOCUMENTS 3,393,116  7/1968  Larson ................................. 428/70

FOREIGN PATENT DOCUMENTS 975415    9/1975   Canada ................................. 219/213
2127567  12/1972   Fed. Rep. of Germany ...... 219/213
2319889  10/1974   Fed. Rep. of Germany ...... 219/213

OTHER PUBLICATIONS

"Easy Heat, Series D Wire Mesh Heating Mats for Electric Snow Melting and Concrete Slab Heating A.I.A. No. 30-4-2" by Singer, Mar. 5, 1968.
"Easy-Heat HEATBANK", published by Easy Heat-Wirekraft (HBG-HSI-0982).

Primary Examiner—Carl D. Friedman
Assistant Examiner—Creighton Smith
Attorney, Agent, or Firm—James R. Haller; Gregory P. Kaihoi

[57] ABSTRACT

An electric radiant heating system for heating building interior living and working space. The system comprises an electric resistance heating cable embedded in a cementitious thermal mass for transferring thermal energy to the thermal mass when an electric current is applied to the cable. The system utilizes a wall-mountable line voltage thermostat control to detect the temperature of the surrounding air, compare it to a selectable reference temperature, and perform a number of functions automatically depending on the results of the temperature comparison. High limit sensors, composed of bimetal strips, detect the temperature of the electric heating cable, sending a signal to the control means to interrupt power to the electric heating system when the electric resistance heating cable reaches a predetermined temperature. Cable-retaining hardware secures the electric resistance heating cable at regularly spaced intervals to the subfloor. The hardware holds portions of the cable above the subfloor to help suspend the cable in the cementitious underlayment layer. The cable is entirely suspended and surrounded by the underlayment during pouring of the cementitious slurry so that the cable does not contact the subfloor.

6 Claims, 3 Drawing Sheets

U.S. Patent   Nov. 7, 1989   4,878,332
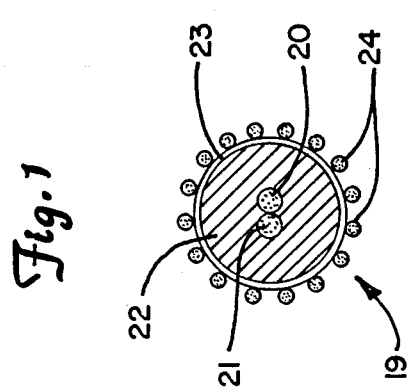
Fig. 1
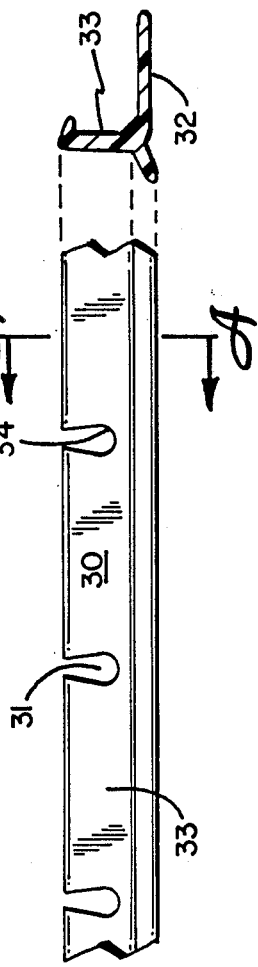
Fig. 2
Fig. 2A

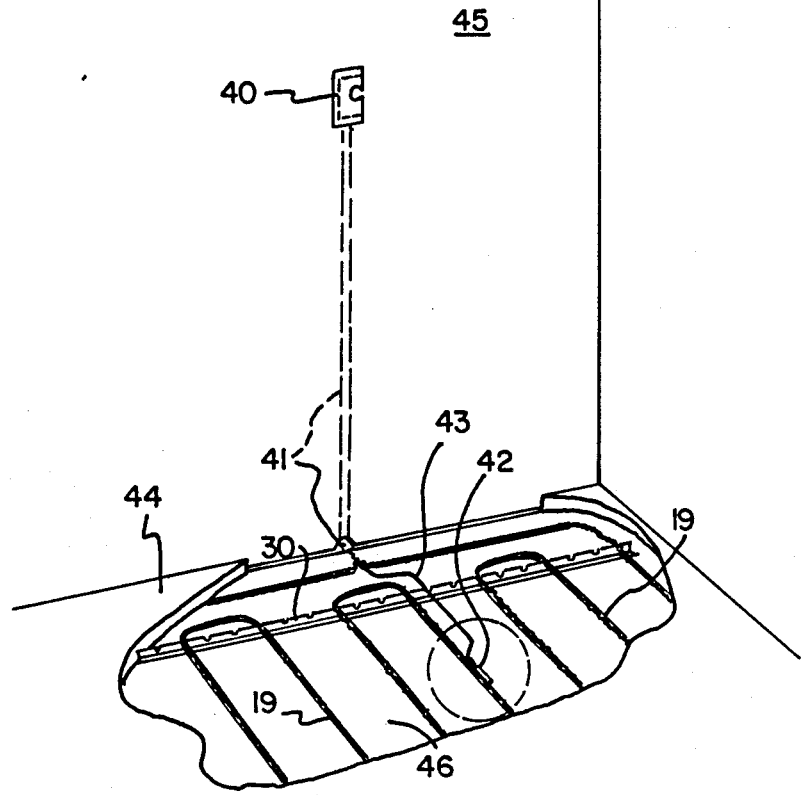
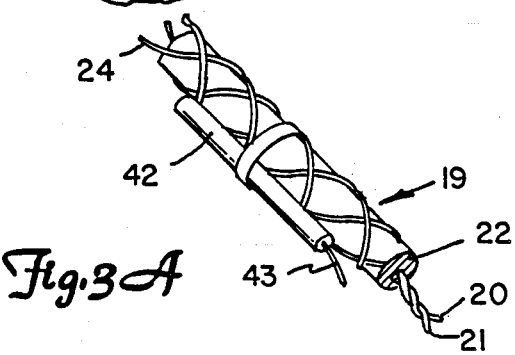

ELECTRIC RADIANT FLOOR HEATING SYSTEM

FIELD OF THE INVENTION

The invention relates to an improved electric floor heating system to heat buildings and other living and working areas utilizing electrical resistance heating.

BACKGROUND OF THE INVENTION

In heating the interiors of buildings, several conventional heating methods have been employed, including hot water/steam and forced air heating. Generally, these heating methods require the installation of large air ducts or extensive water piping, both of which take up a considerable amount of space within a building and require careful planning for locations of vents, radiators, and so forth. Vents and ducts tend to obstruct living and working areas within a building and require other components of the building (ceilings, walls, etc.) to be designed around them. Some hot water systems include piping which is embedded in a flooring or ceiling material through which warm water is circulated to heat a building. In some geographic localities, however, electrical power is cheaper than gas, and direct electric heating is desired.

Electric heating cables have been employed to heat cement slabs and the like by being positioned in a sand layer beneath the slabs. High limit switches have been employed adjacent the cables to sense the cable temperatures and to prevent the cables from-overheating. Temperature sensors imbedded in the concrete slabs regulate the electric current supplied to the heating cable, therefore being regulated room heat by controlling the temperature of the concrete beneath which, embedded in sand, were the electric heating cables. Positioning the temperature sensors in the room air space above the flooring resulted in prohibitively long response times.

SUMMARY OF THE INVENTION

The present invention relates to an electric floor heating system comprising an electric resistance heating cable, through which an electric current is passed, and which is embedded in a layer of gypsum cement-based floor underlayment. Conventional flooring material is carried by the upper surface of the underlayment. A thermostat is carried above the flooring for sensing air temperature and for responsively supplying electrical power to the heating cable when the sensed temperature is below a preset air temperature. A high temperature limit sensor is used to detect the temperature of the embedded electric heating cable. When the high temperature limit sensor senses a cable temperature above a predetermined temperature, the sensor signals the control means to halt the flow of electric current to the heating cables. The high tempeature sensors thereby keep the hydrated gypsum thermal mass from reaching a calcination temperature.

We have found that if the electric cables are embedded in a reasonably thin (e.g., about one inch in thickness) floor underlayment layer made of calcium sulfate hemihydrate-based materials having relatively high calcination temperatures, the temperature of the air within a room can be readily regulated through the use of an air temperature-sensing thermostat. Reasonable response times are thus provided even when the floor underlayment is provided with an overlayer of padding and carpeting or other insulating materials since the thermal mass provided by the calcium sulfate hemihydrate based flooring, in the thicknesses used, transmits heat readily to the top of the underlayment layer.

BRIEF DESCRIPTION OF THE DRAWINGS

FIG. 1 is a cross-sectional view of an electric resistance heating cable which is embedded in a cementitious thermal mass;

FIG. 2 is a perspective view of a cable retaining molding;

FIG. 2A is a cross sectional view taken along line A—A of FIG. 2A;

FIG. 3 is a perspective view of the electric resistance heating system of the invention;

FIG. 3A is an enlgarged view of the portion within circle 3A of FIG. 3; and

DETAILED DESCRIPTION OF THE PREFERRED EMBODIMENT

Figure 4:
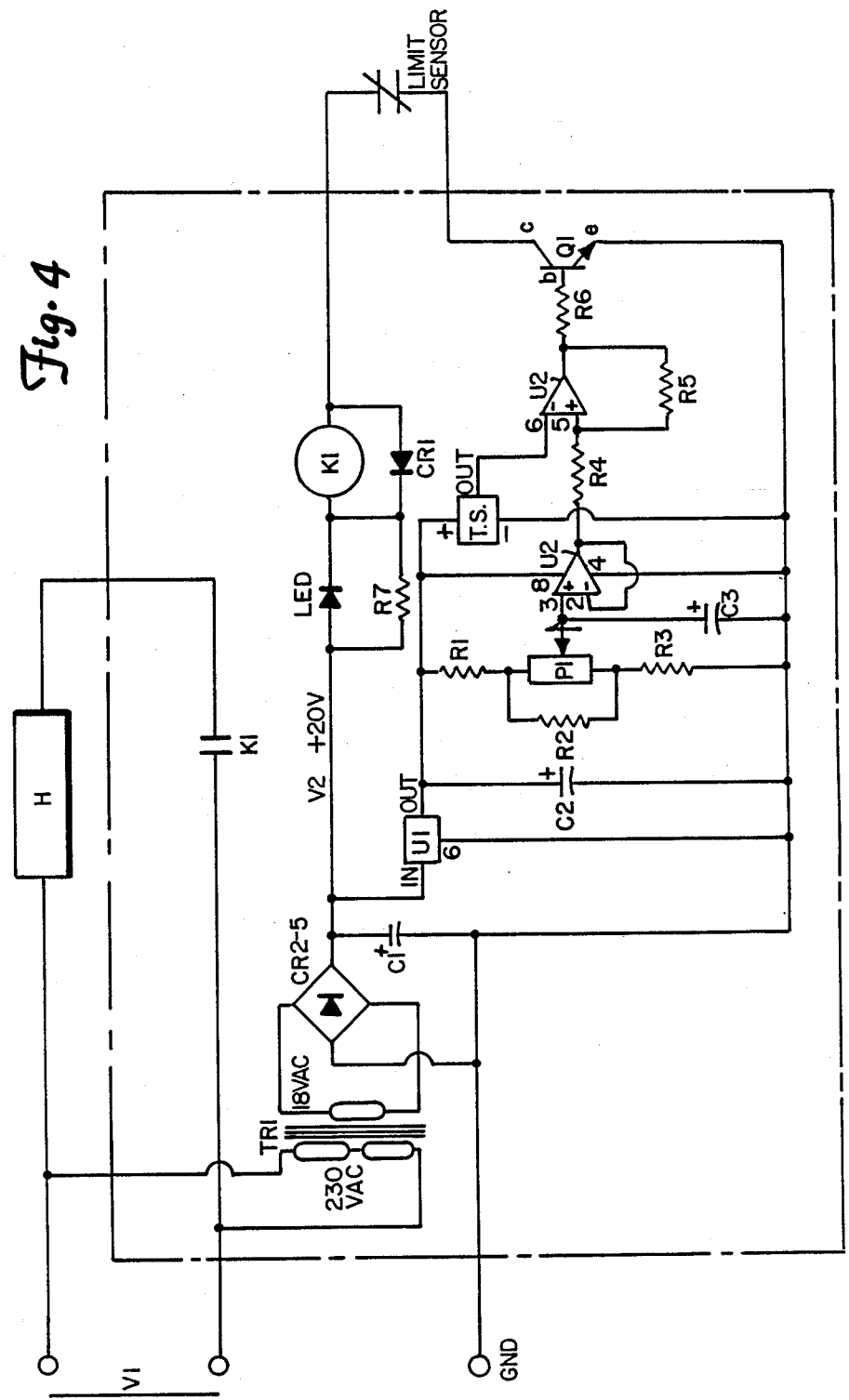
FIG. 4 is a schematic representation of the heating system.

The electric floor heating system of the invention operates by supplying an electric current to an electric resistance heating cable (19) to heat a cementitious thermal mass (44). The cementitious thermal mass (44) conducts thermal energy to the flooring material in contact with it which in turn heats the surrounding room air. Electric resistance heating cable (19) is commercially available from many manufacturers. The electric resistance heating cable (19) desirably comprises an inner twisted copper wire (20) spirally intertwined with a strand of fiberous material (21) to allow for thermal expansion and contraction of the wire (20). The copper wire (20) and the fiberous strand (21) may be sheathed in a fairly soft, flexible wire body coating (22) over which in turn is carried a substantially stiffer, abrasion resistant coating (23) of, e.g., clear PVC (polyvinyl chloride). Finally, over the PVC coating (23) is carried an outer ground wire (24) desirably composed of a plurality of braided brass strands.

Through the use of cable retaining means, the electric resistance heating cable (19) is positioned upon a subflooring material (46) prior to the pouring of a cementitious flooring material (44). The cable retaining means exemplified in FIGS. 2 and 2A, preferably is comprised of an elongated, extruded plastic molding (30), desirably generally "L" or "T" shaped in cross-section. The molding (FIG. 2) includes a horizontal base flange (32) of suitable width and thickness to enable it to be stapled, glued, nailed, screwed, or otherwise suitably attached to a subfloor (46). Extending upwardly from the base (32) is a generally vertical leg (33) containing a plurality of upwardly open spaced slots (31) for receiving and supporting the electric resistance heating cable (19) shown in FIG. 1. The lower portions of the vertical slots (31) desirably are circular to receive and grip the cable (19).

Multiple molding strips desirably are positioned generally parallel to each other, spaced an appropriate distance apart to support the cable, the latter being positioned in a serpentine fashion as shown in FIG. 3 or in such other configuration (e.g., coil form) as to heat the subseguently applied cementitious flooring fairly evenly over its area and to avoid substantial hot spots. The moldings desirably are spaced parallel to each other a distance of, e.g., four feet, and support the cable above the flooring by at least about 1/16 inches at the molding.

Several types of cementitious flooring materials may be suitable for use with the electric heating system of the invention. Gypsum based materials poured as slurrys comprising calcium sulfate hemihydrate, sand and water, and especially those which do not shrink upon curing, are preferred, and of these gypsum-based slurrys, Gyp-crete 2000, Infloor blend floor underlayment (a trademarked product of the Gyp-Crete Corporation and comprising calcium sulfate hemihydrate) is most preferred as the gypsum material cementitious thermal flooring mass.

The calcium sulfate hemihydrate based gypsum material employed in the instant invention desirably contains calcium sulfate hemihydrate, sand, a small amount of portland cement (desirably in the range of about three to about six percent by weight) and not more than about 1% of various retarders, defoaming agents, stabilizers, and viscosity controlling agents, all of which are known to the art. Finely ground food grade sodium citrate may be used as a stabilizer for the slurry, desirably in an amount of about 0.1%–0.5% by weight. The defoamers may be any of the various surfactants that are commonly used to prevent foam production. Desirably sufficient defoamer is used to produce densities in excess of 100 pounds per cubic foot (about 1.6 g/c m$^3$). The retarders may be any of various commercially available products such as Gold Bond brand, available from the Gold Bond Company, or Red Top available from United States Gypsum. Viscosity depressing agents (flow control agents) may be used such as that sold under the trademark "Lomar D", a naphthalene lignosulfonate, although concentrations of this material above about 0.4% preferrably are avoided. The calcium sulfate hemihydrate preferably is provided in the alpha and beta forms with the percentage of beta being at least about 8.5%. The portland cement desirably is type 2 or type 5 cement, and is present in a weight percentage of about 3% to about 6% by weight. Various fillers and other modifiers may be employed as well.

The calcium sulfate hemihydrate-based slurry is formulated to be nonshrinking and to maintain the sand of the slurry substantially uniformly suspended therein. The sand which is employed is a fine aggregate, desirably washed and substantially free of organic matter. The sand particles should substantially all pass through a no. 4 mesh screen.

Sufficient water is employed to provide the slurry with the desired flowability so that when it is poured upon a subfloor, it not only exhibits substantial self-leveling characteristics, but also raises the electric heating cables from the subfloor and suspends them in the slurry. Flowability may be measured by a "patty" test, as follows:

A stainless steel tube is provided having a smooth walled cylindrical inner surface that is 2 inches in diameter and 4 inches in height. The tube is placed upright on a horizontal surface, and a calcium sulfate hemihydrate-based slurry with sand and water is poured into the tube. Once the tube has been filled, any excess slurry at the top of the tube is struck off and the tube is then raised vertically from the horizontal surface in a smooth motion. The slurry thus flows onto the horizontal surface to form a pancake like patty, and achieves its maximum diameter within a matter of ten twenty seconds or so. The calcium sulfate hemihydrate slurries used in the invention should exhibit patty sizes ranging from 7 inches to 9 inches (preferably 7½ to 8½ inches) in diameter. Slurries providing patty sizes of about 8¼ inches have given very good results and are particularly desired. Portland cement-based concrete, which may shrink and crack during cure and hence tend to disrupt the heating cables, is desirably avoided. When an aqueous gypsum based slurry such as Gyp-crete 2000 flooring material is poured over an electric heating cable (19) which is properly supported upon the subfloor (46) the slurry adequately flows around and under the cable (19), raising the cable (19) slightly from contact with the subfloor (46). The cable-retaining means thus desirably does not hold the electric heating cable (19) in direct contact with the subfloor (46).

Although the cable is not buoyant in the cementitious slurry that is poured over it, it has been determined through testing that cable (19) strung between supports (30) will be encased in the slurry and thus supported above the subflooring (46) along substantially its entire length even if the cable (19) rests loosely on the subfloor before the flooring is poured. The cementitious flooring tends to envelop the cable and to hold the cable suspended within it. The depth of the cementitious flooring beneath the electric heating cable (19) in a typical one inch thick flooring installation may be on the order of 1/16 inches. The cable (19) is thus substantially never in direct contact with the subfloor (46).

Desirably the cementitious flooring is about ¾ inches to about 1½ inches in thickness, and preferably about one inch. Thinner floors tend to not exhibit desirable strength characteristics, and thicker floors tend to provide too large a thermal mass to facilitate reasonably responsive control of the heating demand.

Prior to system installation, several characteristics of the building into which the system is to be installed should be determined. The construction of the building and heat-loss calculations desirably are taken into consideration prior to designing the cable layout for the system. Rough-in wiring for the thermostat should be done before the drywall is applied, but the heating cable installation can wait until after the drywalling is completed.

Good room insulating characteristics are a major factor contributing to the efficiency of a radiant floor heating system. A heat loss calculation should be performed, as by using an industry standard heat loss calculation guide, to determine the insulating characteristics of the building. Special attention should be paid to rooms with elements having the potential for high heat loss such as large windows, poor insulation, skylights, and a plurality of outside walls.

The electric current supplied to the electric heating cable (19) is desirably controlled by a line voltage thermostat (40) with a cable limit sensor attached to the embedded electric heating cable (19). The thermostat (40) senses the temperature of the room and compares that temperature with the temperature at which the thermostat wall module (40) is set. If the temperature of the room falls below the set thermostat temperature by a specified amount, the thermostat (40) will automatically close an electrical circuit to send an electric current to the heating cables (19). If the temperature of the room is equal to or greater than the temperature set on the thermostat (40), the electrical circuit will remain open and no current will be supplied to the heating cables (19).

The thermostats should be located on walls where they will not be affected by direct sunlight or drafts. A conduit (41) made of plastic, metal, or other suitable material may extend from the thermostat junction box on a wall downwardly to the floor where it bends 90 degrees towards the horizontal plane of the floor. Control wires for the system are placed within the conduits and are protected by the conduits.

Any of a number of commonly available thermostats may be utilized as a power control unit for the electric floor heating system of the invention. A thermostat that may be utilized to control the system is shown in FIG. 4. This thermostat senses ambient air temperature and turns the heating system on and off to maintain the air temperature at or about the temperature set on the front panel dial. The thermostat is designed to operate on 230 VAC single phase power and can switch load current of up to 20 amps.

One line of the 230 VAC power source is electrically connected to one side of the load (electric heating cables) and the other line of the power source, the power controlled output line, is connected to the thermostat input. The thermostat output is connected to the other side of the load so that the thermostat acts as a switch between the power source and one side of the load. Referring to FIG. 4, the 230 VAC power source is applied to the transformer (TR1) which produces an output voltage of approximately 18 VAC. The output voltage is then converted to approximately 19 VDC by four diodes connected in a bridge. The resulting DC voltage is filtered by capacitor C1 to minimize the ripple or changing voltage. An earth ground wire is connected to the (−) negative side of this DC voltage. A 5 volt, 0.1 amp, regulator V1 is used to feed the control circuit. Capacitor C2 provides filtering and line variation protection. A precision temperature sensor labeled T.S., such as National Semiconductor model LM34, is utilized to sense the ambient air temperature of a room. This particular temperature sensor provides an output of 10 millivolts per degree F. that is proportional to the temperature sensed. Therefore, for a temperature range of, e.g., 55° to 85° F., the corresponding output voltage provided by the sensor is approximately 0.550 to 0.850 volts.

P1 is a 500K potentiometer connected to the front panel dial and is the adjustable set point for this control. Resistors R1, R2 and R3 make up a voltage divider that along with P1 gives an input command signal to amplifier U2-section 1. This amplifier acts as a simple OP-amp isolating the high impedance of P1 from the output amplifier.

If the sensor is slightly offset or is subject to some self heating, an "overrange" capability allows positioning of the knob during assembly in a position corresponding to or making up for this offset.

The set point signal is fed to the (+) plus input of amplifier U2-section 2 which in this application is performing like a comparator. If this signal is greater (more positive) than the sensor output signal which is fed to this amplifier's (−) minus input, then the amplifier output starts in a positive direction. As the output starts positive it provides positive or regenerative feedback to the amplifier (+) plus input which then accelerates the output to the maximum positive output level. This output signal produces a current through R6 to the base of transistor Q1 which in turn turns on to a saturated or maximum "on" condition. This in turn results in relay K1 being turned on. The relay current comes from the unregulated (+) plus D.C. supply through R7 and the LED (light emitting diode) which is now lighted. R7 is used to simply divert some of the relay current around the LED thereby keeping the LED current within rating.

Note that the relay current goes through the over-temperature limit switch which is a simple, normally closed, temperature switch embedded along with the heater in the floor. If the floor overheats (above 130° F.), this switch opens and de-energizes relay K1. When K1 is energized, contacts K1 close and power is transmitted from the black input lead to the red output lead and in turn to the load.

As the environment is heated, the sensor (T.S.) output goes positive until it is greater than the input command, at which time the amplifier U2-section 2 output drives to ground potential shutting off Q1 and in turn de-energizing K1. Diode CR1 is used to simply take care of the induction kick of K1 as it is shut off.

Positive feedback resistor R5 provides two functions. It helps accelerate the switch action of Q1 and, along with R4, provides a fixed hysteresis of approximately 3° F.

As a precaution against overheating the cementitious floor material (44). the system is equipped with one or more limit sensors (42) that are designed to signal the thermostat (40) to turn off the flow of electric current to the heating cables (19) when the cables (19) reach a predetermined temperature. The limit sensors (42) are tied, taped, or otherwise suitably attached directly to the outer wall of the embedded heating cable (19) a shown in FIG. 3A, and are wired to the thermostat (40) by leads (43). The limit sensor (42) is self-resetting so that when the temperature of the cable (19) drops below a predetermined temperature, electric current is again permitted to flow to the heating cables (19). Accordingly, the entire system senses both the air temperature within a room and also the temperature of at least one point adjacent an electric heating cable (19) buried in the cementitious flooring material (44). The heating cable temperature may, in this manner, be limited to, for example, 140° F. (60° C.) by the limit sensors attached to the cables. A recommended floor surface temperature (at the top of a floor covering such as linoleum or carpeting) of 85° is generally accepted for comfort where there is prolonged foot contact with the floor.

When gypsum products are subjected to elevated temperatures of about 105° to 110° F. (about 40.6° to about 43.3° C.), they tend to lose water of crystallization and to revert to the hemihydrate form. The destruction of dihydrate crystalline structure results in a significant loss in strength as the gypsum material becomes chalky and weak. This poses a serious problem for gypsum systems employing high temperature heating elements such as electrical resistance heating elements and hot water piping. U.S. Pat. No. 3,393,116, the teachings of which are incorporated herein by reference, reports that the addition to the hemihydraft of approximately 0.05% to 0.65% of boric acid and 0.05% to 1.25% of glycerol, based on the weight of the hemihydrate, results in an elevation of the dehydration temperature to 150° F. (about 65.6° C.). Floors prepared from the gypsum based slurrys prefered for use with this invention exhibit dehydration temperatures of not less than, about 145° F. (62.8° C.) and preferably not less than 150° C. (65.6° C.). Gyp crete 2000, which is a preferred gypsum flooring material for use in the invention, contains boric acid and glycerol in appropriate amounts to increase its calcination (dehydration) temperature to at least 150° F. (65.6° C.).

The electric heating system of the invention desirably is capable of producing more than 16 watts per square foot of floor space. The actual power output of the system is governed by floor covering, desired surface temperatures, and cable spacing.

When the heat loss of an area has been calculated, the actual floor area to be used for radiant heat may be calculated by subtracting the total area six inches away from walls and cabinets around the perimeter of the room and elsewhere. The area heat loss, divided by the actual radiant floor area, yields the required floor output in BTU per square foot (British Thermal Units per square foot).

Floor coverings affect the performance of radiant heating systems because of their insulating qualities and must therefore be selected judiciously. The insulating R-value of the floor covering must be added to the R-value of the carpet pad (if any) to obtain the total R value for the floor covering. Floor coverings with a lower R-value are preferred for radiant floor heating systems to allow the heat to more readily radiate upwardly.

The selection of heating cable size is a function of the size of the zone to be heated and the spacing of the cables embedded in the thermal mass. Close cable spacing may be necessary in areas adjacent windows, whereas farther apart spacing may be desirable for other locations such as basements and storage areas. A supplemental heating system may be used to compensate for extraordinary heat demand areas, e.g., adjacent windows or doors, if the actual floor output is insufficient.

While a preferred embodiment of the present invention has been described, it should be understood that various changes, adaptations and modifications may be made therein without departing from the spirit of the invention and the scope of the appended claims.

What is claimed is:

1. A method of installing an electric radiant floor heating system comprising the steps of: placing, on a subfloor, a flexible electric resistance heating cable; pouring upon the subfloor a sufficient quantity of a substantially self-leveling slurry comprises of water, calcium sulfate hemihydrate and sand to raise the electric heating cable from the floor so that it is substantially completely embedded in the slurry, and to form an underlayment layer having a thickness of about ¾ inches to about 1.5 inches; and permitting the slurry to harden while the slurry maintains said cable suspended therein, portions of the cable thereby being held essentially out of contact with the subflooring solely by the slurry and being spaced thereabove by at least about 1/16 inches.

2. A method of installing an electric radiant floor heating system comprising the steps of: placing, on a subfloor, an electric resistance heating cable; electrically coupling the cable to a source of electric power, an air temperature-sensing thermostat for controlling electric power provided to the cable, and a cable limit sensor for sensing the temperature of the cable and for interrupting the flow of electric power to the cable when the sensed temperature exceeds a pre-selected temperature; pouring upon the subfloor a sufficient quantity of a substantially self-leveling slurry, comprised of water, calcium sulfate, hemihydrate, and sand to raise the electrical heating cable from the floor so that it is substantially completely imbedded in the slurry, and to form an underlayment layer having a thickness of about ¾ inches to about 1.5 inches; the slurry imbedding the cable limit sensor in the floor underlayment in temperature-sensing contact with the cable; and permitting the slurry to harden while the slurry maintains said cable suspended therein, the cable thereby being held essentially out of contact with the subflooring by the slurry and being spaced thereabove by at least about 1/16 inches.

3. The method of claim 1 wherein said floor underlayment is provided at a thickness of about one inch.

4. The method of claim 1 including the step of providing a flooring material over and supported by the underlayment layer.

5. The method of claim 1 including the step of mounting to the subfloor a plurality of cable spacer means for holding the electric cable at spaced points along its length to the subfloor, thereby preventing substantial movement of the cable during the slurry pouring step.

6. The method of claim 5 wherein the cable spacing means comprises cable spacers which elevate the cable above the subfloor at the points of attachment to the cable, adjacent cable spacers along the length of the cable permitting the cable to lie upon the subfloor between said cable spacers.

* * * * *